United States Patent
Cho et al.

(10) Patent No.: US 12,544,589 B2
(45) Date of Patent: Feb. 10, 2026

(54) LIGHT THERAPY APPARATUS

(71) Applicant: HEALING SOUND CO., LTD., Seoul (KR)

(72) Inventors: Seung Hyun Cho, Seoul (KR); In Bum Yu, Seoul (KR); Jun Gu Kang, Goyang-si (KR)

(73) Assignee: HEALING SOUND CO., LTD., Seoul (KR)

( * ) Notice: Subject to any disclaimer, the term of this patent is extended or adjusted under 35 U.S.C. 154(b) by 338 days.

(21) Appl. No.: 18/033,734

(22) PCT Filed: Nov. 1, 2021

(86) PCT No.: PCT/KR2021/015581
§ 371 (c)(1),
(2) Date: Apr. 25, 2023

(87) PCT Pub. No.: WO2023/074976
PCT Pub. Date: May 4, 2023

(65) Prior Publication Data
US 2024/0382777 A1    Nov. 21, 2024

(30) Foreign Application Priority Data

Oct. 28, 2021    (KR) .................. 10-2021-0146004

(51) Int. Cl.
*A61N 5/06*    (2006.01)

(52) U.S. Cl.
CPC ......... *A61N 5/0624* (2013.01); *A61N 5/0603* (2013.01); *A61N 2005/0605* (2013.01); *A61N 2005/0626* (2013.01); *A61N 2005/0647* (2013.01); *A61N 2005/0652* (2013.01); *A61N 2005/066* (2013.01); *A61N 2005/0663* (2013.01)

(58) Field of Classification Search
CPC ...... A61N 5/0624; A61N 5/0603; A61N 5/06; A61N 5/0625; A61N 2005/0605; A61N 2005/0626; A61N 2005/0647; A61N 2005/0652; A61N 2005/066; A61N 2005/0663; A61N 2005/0659; A61N 2005/0662
USPC ....................................... 607/88–92
See application file for complete search history.

(56) References Cited

U.S. PATENT DOCUMENTS

| | | | |
|---|---|---|---|
| 2012/0253166 A1* | 10/2012 | Ahn ............... | A61B 5/0036 600/407 |
| 2022/0161054 A1* | 5/2022 | Drinan ............ | A61N 5/0613 |
| 2023/0381535 A1* | 11/2023 | Krietzman ........ | A61M 31/00 |

FOREIGN PATENT DOCUMENTS

| | | | |
|---|---|---|---|
| CN | 113082534 A * | 7/2021 | ......... A61N 5/0603 |
| JP | 2006-319604 A | 11/2006 | |
| KR | 10-1754840 B1 | 7/2017 | |

(Continued)

OTHER PUBLICATIONS

International Search Report for PCT/KR2021/015581 mailed Jul. 22, 2022 from Korean Intellectual Property Office.

*Primary Examiner* — Nathan J Jenness
(74) *Attorney, Agent, or Firm* — Paratus Law Group, PLLC (57) ABSTRACT

There is provided a light therapy device including: bodies supported against a user's auricles; and generators disposed on one side of the bodies to irradiate light, wherein each generator comprises a casing and a plurality of LEDs disposed on one side of the casing to irradiate the light with different wavelengths from one another.

6 Claims, 9 Drawing Sheets

(56) References Cited

FOREIGN PATENT DOCUMENTS

| KR | 10-1954236 B1 | 5/2019 |
| KR | 10-2021-0051811 A | 5/2021 |
| KR | 10-2021-0075492 A | 6/2021 |

* cited by examiner

LIGHT THERAPY APPARATUS

CROSS-REFERENCE TO PRIOR APPLICATIONS

This application is a National Stage Patent Application of PCT International Patent Application No. PCT/KR2021/015581 (filed on Nov. 1, 2021) under 35 U.S.C. § 371, which claims priority to Korean Patent Application No. 10-2021-0146004 (filed on Oct. 28, 2021), which are all hereby incorporated by reference in their entirety.

BACKGROUND

The present invention relates to a light therapy device, and more specifically, to a light therapy device that is capable of selectively irradiating light with different wavelengths, thereby preventing noise induced hearing loss and treating otitis media and otitis externa more efficiently.

According to National Health Insurance Service in Korea, it is estimated that the number of people with hearing loss is about 8.09 millions in 2018, and in case of patients with the noise induced hearing loss among the hearing loss, teenager and young people who are in their thirties reach 38% of the patients. They have the rate higher by two times than old people who are in their sixties or more reaching 17% of the patients.

Recently, young patients with otitis media and otitis externa as well as noise induced hearing loss are drastically increasing, and to treat such diseases, infrared irradiation devices are used.

The infrared irradiation devices are divided differently in size or shape according to their use purpose, and representatively, there are portable infrared irradiation devices each having a handle through which infrared light is irradiated onto a user's desired body region.

However, the conventional infrared irradiation devices are configured to irradiate only one type of infrared light so that it is impossible to select appropriate wavelengths according to different physical structures of users and the inflammation levels of the users.

SUMMARY

Accordingly, the present invention has been made in view of the above-mentioned problems occurring in the related art, and it is an object of the present invention to provide a light therapy device that is capable of selectively irradiating light with different wavelengths, thereby preventing noise induced hearing loss and treating otitis media and otitis externa more efficiently.

The technical problems to be achieved through the present invention are not limited as mentioned above, and other technical problems not mentioned herein will be obviously understood by one of ordinary skill in the art through the following description.

To accomplish the above-mentioned objects, according to one aspect of the present invention, a light therapy device may include: bodies supported against a user's auricles; and generators disposed on one side of the bodies to irradiate light, wherein each generator comprises a casing and a plurality of LEDs disposed on one side of the casing to irradiate the light with different wavelengths from one another.

According to the light therapy device of the present invention, further, the plurality of LEDs are spaced apart from one another by a predetermined distance.

According to the light therapy device of the present invention, moreover, the plurality of LEDs are disposed in a row.

According to the light therapy device of the present invention, further, the bodies are roundedly formed.

The light therapy device of the present invention may further include management parts disposed on one side of the bodies, and each management part may include: a communication part communicating with an external device; a battery for supplying power to the corresponding generator; a controller electrically connected to the communication part and controlling the operation of the corresponding generator; and a temperature sensor for measuring the surface temperature of the corresponding generator.

To accomplish the above-mentioned objects, according to another aspect of the present invention, a light therapy device include: bodies supported against a user's auricles; may generators disposed on one side of the bodies to irradiate light; and management parts disposed on one side of the bodies, wherein each generator may include a plurality of LEDs having a main LED for irradiating far-infrared light and a plurality of sub LEDs for irradiating near-infrared light.

According to the light therapy device of the present invention, moreover, each management part may include: a communication part communicating with an external device; a battery for supplying power to the corresponding generator; a controller electrically connected to the communication part and controlling the operation of the corresponding generator; and a temperature sensor for measuring the surface temperature of the corresponding generator.

According to the light therapy device of the present invention, further, the controller may control the main LED or the sub LEDs according to the measured temperature through the temperature sensor to thus allow the main LED or the sub LEDs to irradiate the infrared light.

Further, the light therapy device of the present invention may further include a display part spaced apart from the bodies to receive the operating states of the controllers, the temperature sensors, and the generators from the communication parts and thus display the received operating states.

According to the light therapy device of the present invention, further, the controller may control the main LED and the sub LEDs, if the power is supplied from the battery to the corresponding generator, to allow the main LED and the sub LEDs to irradiate the far-infrared and near-infrared light, so that if the measured temperature through the temperature sensor is greater than a predetermined temperature, the controller controls the main LED to allow the irradiation of the far-infrared light from the main LED to be stopped.

According to the present invention, the light therapy device has the following effectiveness.

The light therapy device according to the present invention is configured to allow the generators from which the infrared light is irradiated to operate in the state of being inserted into the earholes, thereby effectively transferring the infrared light to the insides of the ears. Accordingly, noise induced hearing loss, otitis media, and otitis externa may be effectively treated through the light therapy device.

According to the present invention, the bodies and the extension bodies are brought into contact with the outer peripheral surfaces of the user's auricles, and as they are roundedly formed, advantageously, his or her pain that may be caused due to their wearing for long hours can be minimized. Further, the escape of the bodies from his or her auricles can be prevented, and his or her comfort while wearing the bodies can be improved.

According to the present invention, even though the plurality of LEDs simultaneously irradiate the infrared light, the interference of the infrared light irradiated from one LED with the infrared light irradiated from another adjacent LED can be minimized.

According to the present invention, the display part for checking a treatment process is provided so that the user can check the treatment process, and further, appropriate irradiation time can be guided according to information of his or her age and conditions.

According to the present invention, the appropriate infrared light is irradiated according to the measured temperatures through the temperature sensors, thereby preventing the damage and burning caused due to heating from occurring, while the infrared treatment is being automatically performed.

According to the present invention, the far-infrared light is irradiated from the main LED, and the near-infrared light is irradiated from the sub LEDs, so that the infrared light can be balancedly irradiated onto the user's ear.

The effectiveness of the invention is not limited as mentioned above, and it should be understood to those skilled in the art that the effectiveness of the invention may include another effectiveness as not mentioned above from the detailed description of the present invention.

DETAILED DESCRIPTION

The terms used in the present invention will be briefly explained, and next, embodiments of the present invention will be described in detail.

All terms used herein, including technical or scientific terms, unless otherwise defined, have the same meanings which are typically understood by those having ordinary skill in the art. The terms, such as ones defined in common dictionaries, should be interpreted as having the same meanings as terms in the context of pertinent technology, and should not be interpreted as having ideal or excessively formal meanings unless clearly defined in the specification.

In the description, when it is said that one portion is described as "includes" any component, one element further may include other components unless no specific description is suggested.

The following drawings herein illustrate preferred embodiments of the present invention and serve to facilitate the general understanding of the scope of the present invention, together with the detailed description of the present invention. However, this does not limit the invention within specific embodiments.

The technical problems, solutions, and advantageous effectiveness of the present invention may be involved in the embodiments and drawings as will be discussed later. Objects, characteristics and advantages of the present invention will be more clearly understood from the detailed description as will be described below and the attached drawings.

Hereinafter, the present invention will be described in detail with reference to the attached drawings.

Figure 1:
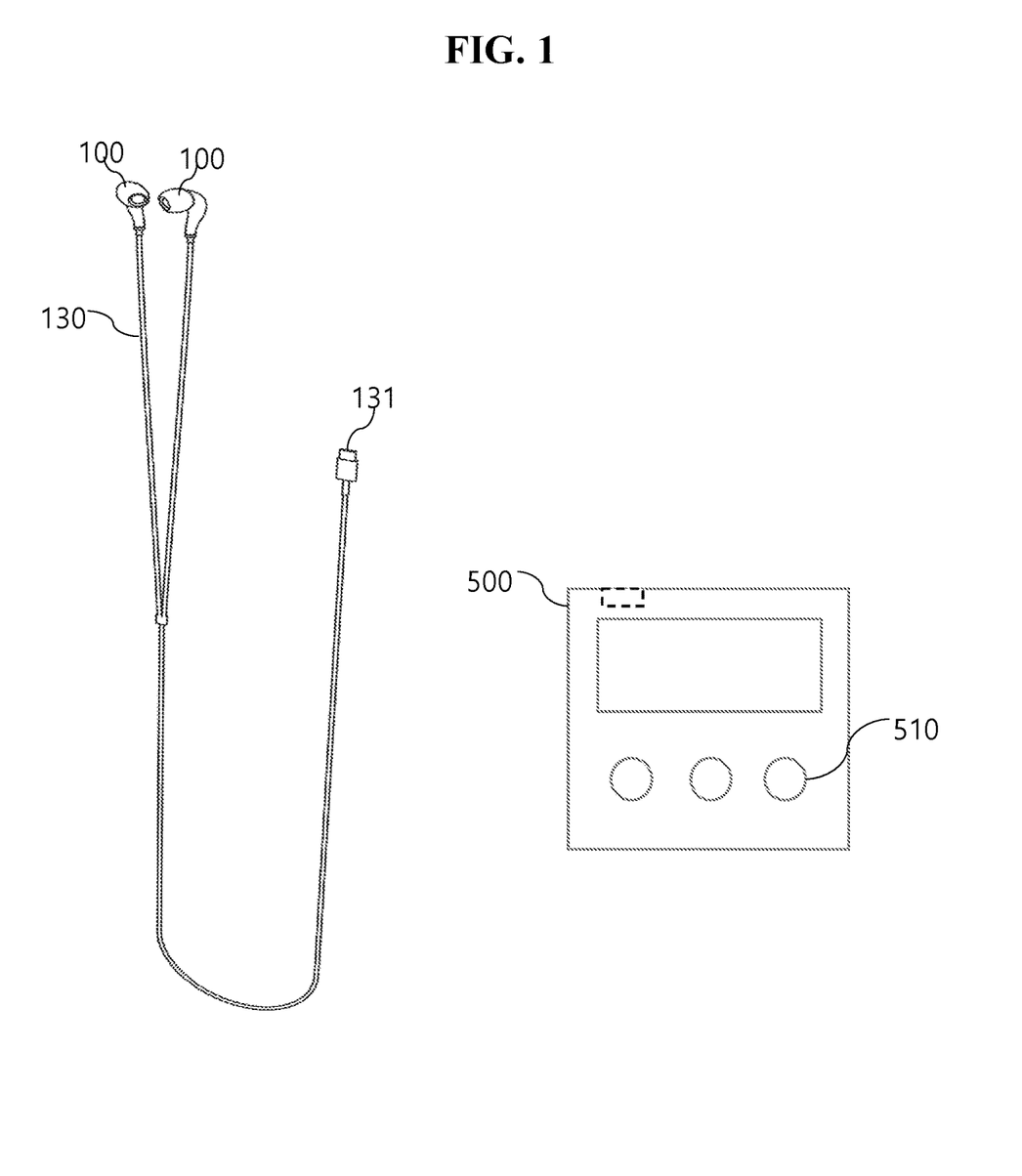
FIG. 1 is a perspective view showing a light therapy device according to an embodiment of the present invention.
Figure 2:
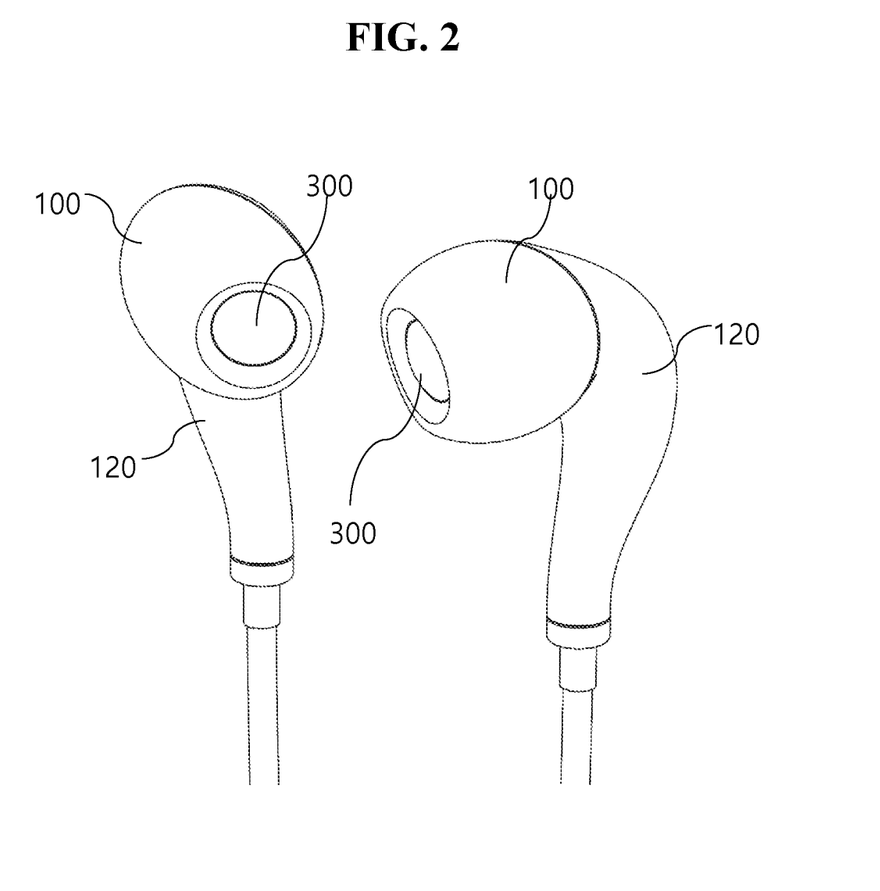
FIG. 2 is an enlarged perspective view showing bodies of the light therapy device according to the embodiment of the present invention.

Referring to FIGS. 1 and 2, a light therapy device 1000 according to an embodiment of the present invention includes bodies 100 supported against a user's auricles and generators 300 disposed on one side of the bodies 100 to irradiate light, and each generator 300 has a casing 310 and a plurality of LEDs disposed on one side of the casing 310 to irradiate the light with different wavelengths from one another.

First, the bodies 100 have the outer appearance of the light therapy device 1000 according to the present invention. The bodies 100 are configured to be supported against the user's auricles upon a treatment. For example, the bodies 100 may have the shapes of earphones used generally for listening music. In specific, the bodies 100 are entirely rounded.

In more specific, the bodies 100 are supported against the user's auricles, while at least portions thereof are being inserted into the auricles. In this case, the bodies 100 include extension bodies 120 rounded and extending downward therefrom. In specific, the bodies 100 and the extension bodies 120 are brought into contact with the outer peripheral surfaces of the user's auricles, and as they are roundedly formed, advantageously, his or her pain that may be caused due to their wearing for long hours can be minimized. Further, the escape of the bodies 100 from his or her auricles can be prevented, and his or her comfort while wearing the bodies 100 can be improved. That is, the bodies 100 and the extension bodies 120 have generally hook-like shapes.

Figure 3:
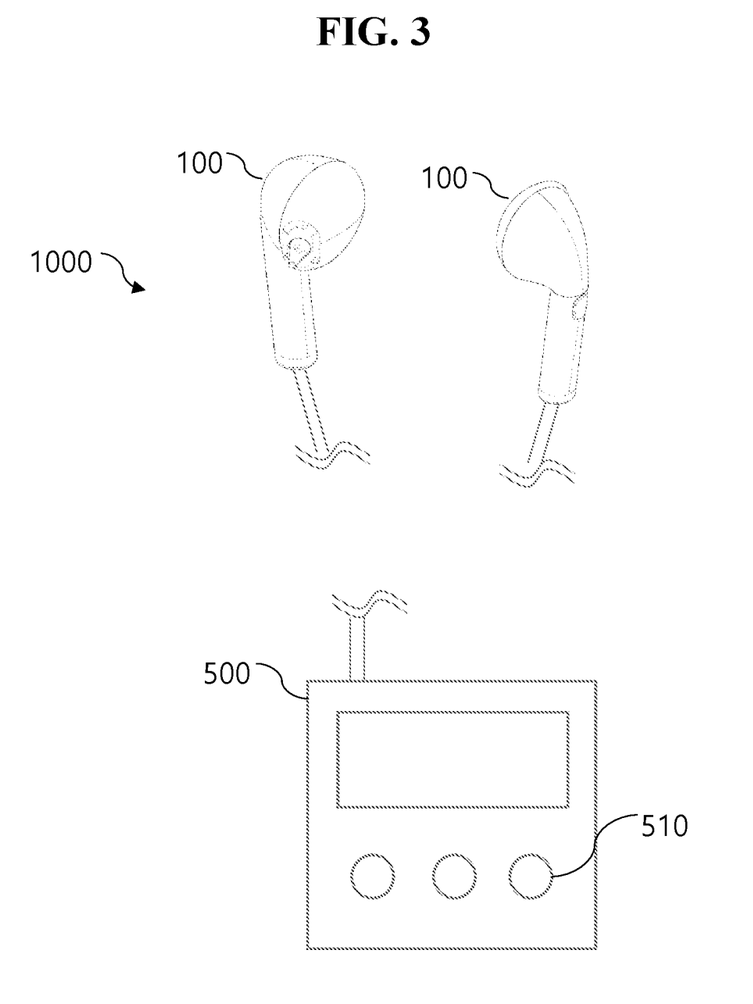
FIG. 3 is a perspective view showing a light therapy device according to another embodiment of the present invention.
Figure 4:
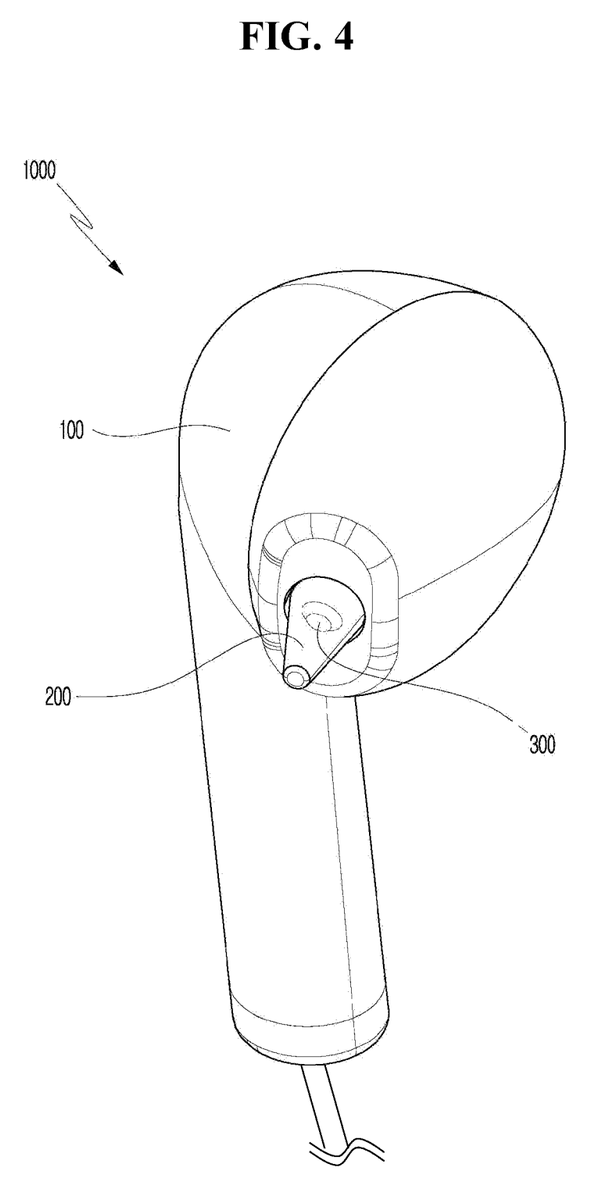
FIGS. 4 and 5 are enlarged perspective views showing a body of the light therapy device according to another embodiment of the present invention.
Figure 5:
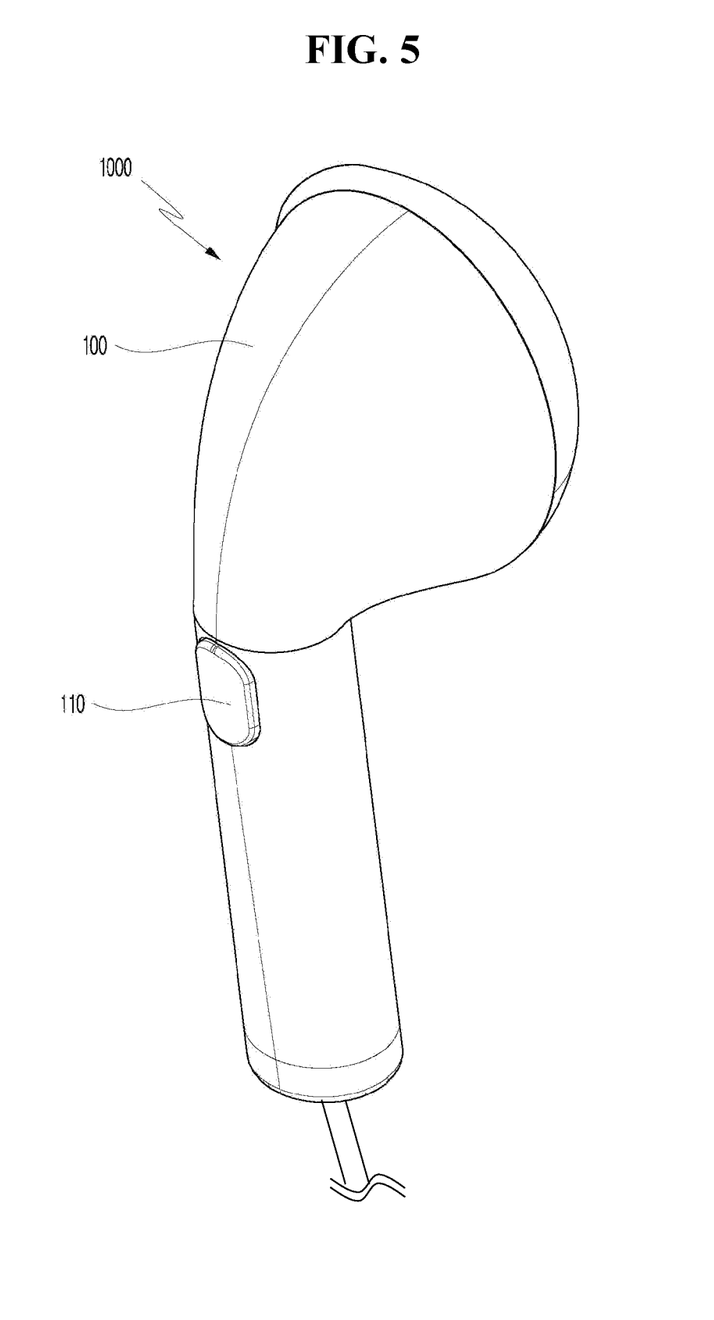

Referring to FIGS. 3 to 5, the light therapy device 1000 further includes earhole insertion members 200 coupled to the front portions of the bodies 100 and thus inserted into the user's earholes.

The earhole insertion members 200 are detachably coupled to the bodies 100. For example, if the generators 300 disposed inside the bodies 100 are broken or do not work, they are conveniently repaired or replaced with new ones in a state where the earhole insertion members 200 are detached from the bodies 100.

Like this, the earhole insertion members 200 are configured to be insertable into the user's earholes.

The infrared light generated from the generators 300 passes through the earhole insertion members 200 and is irradiated onto the insides of the user's ears, thereby effectively treating noise induced hearing loss, otitis media, and otitis externa.

Like this, the infrared light irradiated from the generators 300 relaxes the muscles holding the eardrums and thus relieves the fatigue of the ears. For example, in case of a worker who is normally in a site exposed to noise for long hours, a person who listens music for long hours, or a person who easily feels tired, the light therapy device 1000 according to the present invention relaxes his or her ear muscles after his or her working or listening and thus relieves his or her ear fatigue.

Further, the light therapy device 1000 removes the moisture from the insides of the ears and thus suppresses the bacteria that may exist inside the ears from growing, thereby preventing the occurrence of otitis media and otitis externa.

Like this, the generators 300 emit the infrared light in a state of being inserted into the insides of the user's ears, together with the earhole insertion members 200, and accordingly, blood vessels around the earholes are expanded, thereby activating immune cells through blood flow improvement and sterilizing the bacteria causing all types of diseases.

In this case, the earhole insertion members 200 are configured to prevent the heat generated from the generators 300 from being transferred directly to the inside skins of the ears. For example, this is to prevent the earholes coming into contact with the earhole insertion members 200 from being burnt during the infrared treatment.

Accordingly, the earhole insertion members 200 are made of, for example, a heat resistance material such as ABS material. In this case, of course, the earhole insertion members 200 may be not necessarily made of the ABS material, but made of any material with excellent heat resistance. Further, the earhole insertion members 200 are tapered. In specific, the earhole insertion members 200 have conical shapes whose diameters become gradually small toward the user's ears, thereby minimizing their escape from his or her ears and obtaining comfortable fits.

Further, the generators 300 irradiate infrared light as representative light. The infrared light emitted from the generators 300 has various wavelengths. For example, the generators 300 irradiate the infrared light with a wavelength of 405 to 660 nm effective in improving skin diseases such as acne and treating inflammation and the infrared light with a wavelength of 660 to 870 nm effective in relieving pains. The intensities of the infrared light emitted from the generators 300 will be adjusted through the control of power supply parts 110 as will be discussed later.

In this case, the wavelengths of the infrared light emitted from the generators 300 may not be limited only to such ranges as mentioned above.

Further, the bodies 100 have the power supply parts 110 adapted to control the operations of the generators 300. The power supply parts 110 serve to adjust the intensities of the infrared light emitted from the generators 300. In specific, if the user's finger touches each power supply part 110 to move the power supply part 110 up and down, the intensities of the infrared light emitted from the generators 300 are adjusted.

Further, the power supply parts 110 serve to turn on and off the generators 300. In specific, if the power supply parts 110 are pressed once by the user, the generators 300 operate, and if the power supply parts 110 are pressed once more, the generators 300 that are operating are stopped.

For example, if the buttons of the power supply parts 110 are first pressed, the light therapy device 1000 are turned on and then turned off automatically in a given period of time (e.g., two to three minutes) so as to prevent the insides of the user's ears from being burnt. Next, the light therapy device 1000 is not turned on for one minute so that it can be prevented from being overheated.

Next, the light therapy device 1000 of the present invention further includes a display part 500 for displaying the operating states of the generators 300 and allowing the operations of the generators 300 to be controlled by the user. In specific, the display part 500 is connected to the bodies 100 through wires 130 and a port 131 and displays the operating states of the generators 300 and the measured values of temperature sensors as will be discussed later, thereby permitting the operating states of the generators 300 to be easily checked by the user. Further, an actual battery capacity of a battery 420 is checked on the display part 500.

Further, the display part 500 has a plurality of buttons 510 with which the operations of the generators 300 are controlled by the user. For example, the first button is a timer button that is set to permit the generators 300 to operate for three minutes if pressed one time, for five minutes if pressed two times, for eight minutes if pressed three times, for ten minutes if pressed five times, for 20 minutes if pressed five times, for 30 minutes if pressed six times, and for three minutes if pressed seven times. Further, the second button is a use purpose button that is set to permit near-infrared light and red light to be simultaneously irradiated if pressed one time and to permit far-infrared light to be irradiated if pressed two times. Moreover, the third button is a start and a forced stop button that is set to allow the infrared radiation to start according to set time and wavelengths and to allow the infrared radiation to be stopped if pressed again.

Further, a controller 430 as will be discussed later executes any one of an automatic mode and a control mode, so that in the automatic mode, the generators 300 are controlled by the controller 430, and in the control mode, the generators 300 are controlled by the user.

Figure 6:
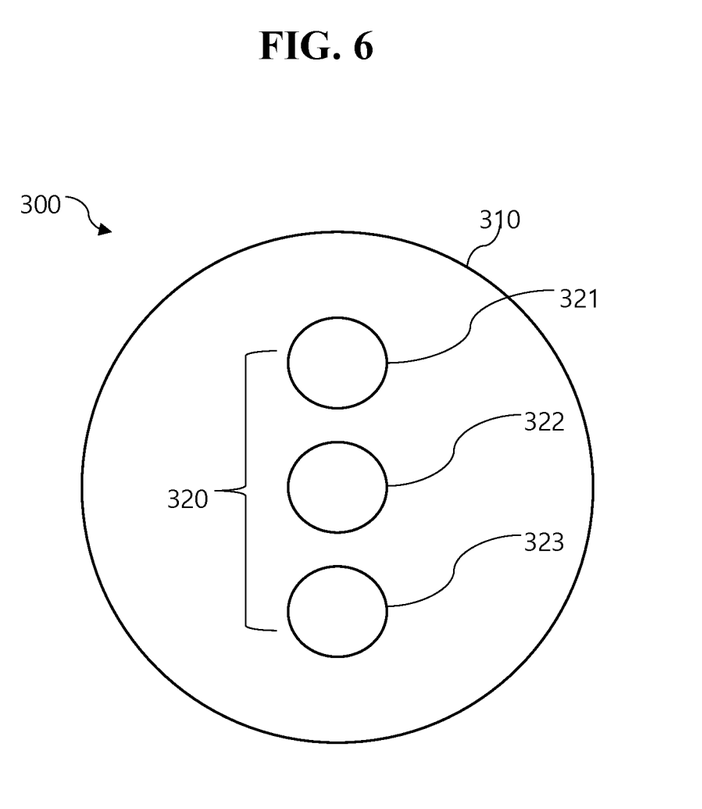
FIG. 6 is a block diagram showing a configuration of a generator of the light therapy device according to the present invention.

Referring next to FIG. 6, the casing 310 has a circular sectional shape and serves to fix the plurality of LEDs 320 thereto. In this case, the plurality of LEDs 320 are detachably mounted onto the casing 310, and if any one or more of the plurality of LEDs 320 are broken or do not work, they are separated from the casing 310 and conveniently repaired or replaced with new ones. Further, the casing 310 is separable from the corresponding generator 300.

For example, the plurality of LEDs 320 include a first LED 321, a second LED 322, and a third LED 323. In this case, the first LED 321 irradiates red light with a wavelength of 652 to 660 nm, the second LED 322 irradiates near-infrared light with a wavelength of 940 nm, and the third LED 323 irradiates far-infrared light.

First, the far-infrared light irradiated from the third LED 323 deeply permeates an object because of its long wavelength and easily vibrates molecules of matters of the object, so that the object is heated. If the far-infrared light is irradiated onto the user's ears, it finely vibrates the water and protein molecules constituting the cells of the ears about 2,000 times per one minute, thereby facilitating the activation of the cells and raising the body temperature. As a result, the far-infrared irradiation has various actions such as a heating action for keeping the body temperature to an appropriate temperature, a facilitating action for helping growth of cells, an action for balancedly supplying nutrients, a dryness and moisture action for keeping appropriate moisture in a human body, a neutralizing action for facilitating waste discharging and neutralizing odors, and a resonance action for dissolving all types of nutrients to achieve nutrition balance and facilitating metabolism functions.

Further, the near-infrared light irradiated from the first LED 321 and the second LED 322, which has short wavelengths, has various actions such as a metabolism activation action for activating the mitochondria generating bio-energy from cells to thus produce more healthy cells, a skin care action for providing skin lifting, anti-wrinkle effect, elasticity, skin regeneration, and the like, a chronic fatigue recovery action obtained through muscle relax and toxic waste discharge, and a brain function developing action for improving learning ability and cognitive ability and helping dementia prevented.

In this case, the plurality of LEDs 320 are spaced apart from one another by a predetermined distance. Further, the plurality of LEDs 320 are disposed in a row. In specific, the first LED 321, the second LED 322, and the third LED 323 are spaced apart from one another by a predetermined distance and arranged along an imaginary straight line passing through the center of the casing 310. Accordingly, even though the plurality of LEDs 320 simultaneously irradiate the infrared light, the interference of the infrared light irradiated from one LED with the infrared light irradiated from another adjacent LED can be minimized.

Figure 7:
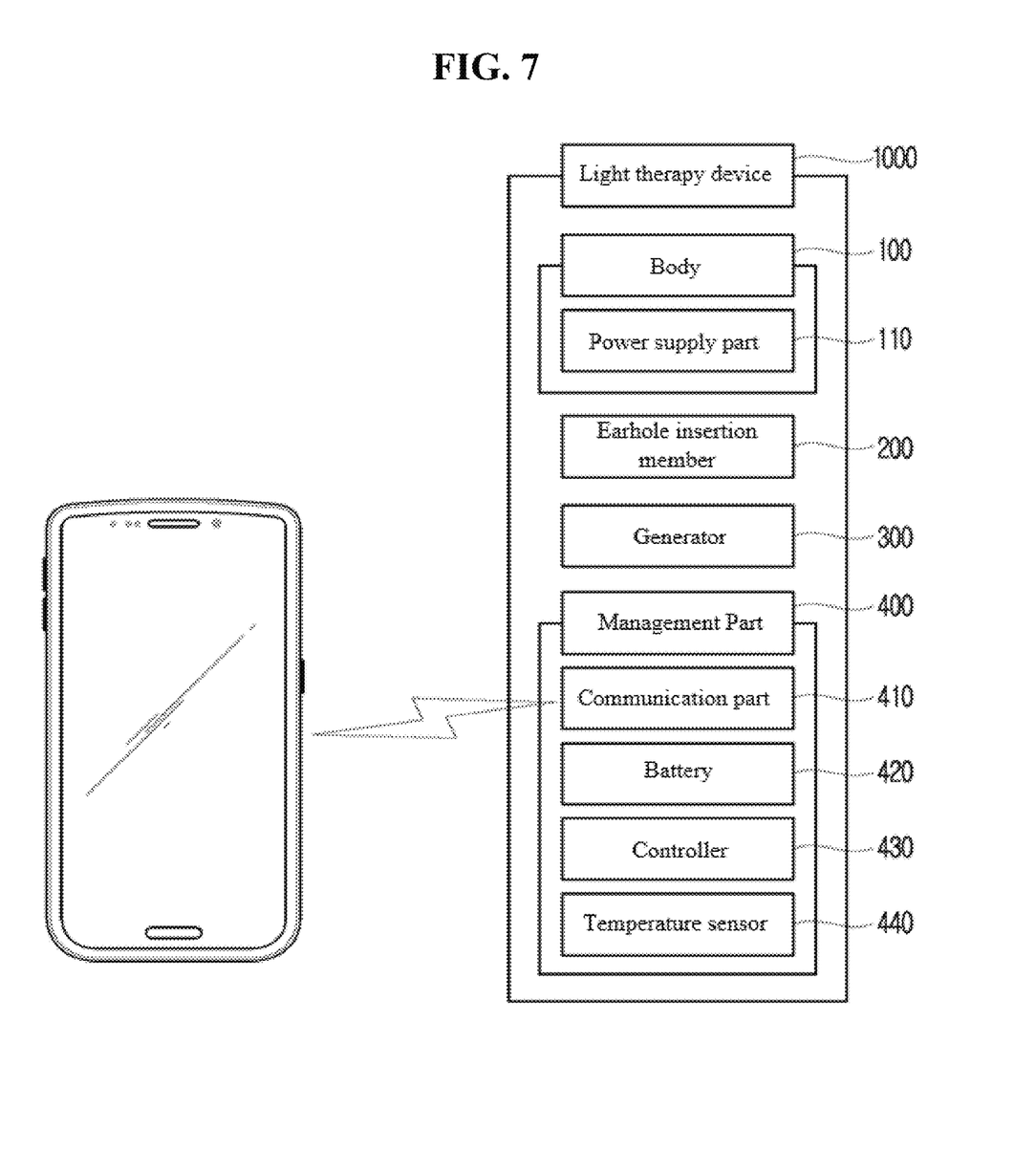
FIG. 7 is a block diagram showing the entire configuration of the light therapy device according to the present invention.

Referring further to FIG. 7, the light therapy device 1000 of the present invention further includes management parts 400 disposed on one side of the bodies 100. The management parts 400 are disposed inside the bodies 100 and thus control the operations of the light therapy device 1000 of the present invention.

Each management part 400 includes a communication part 410, the battery 420, the controller 430, and a temperature sensor 440.

In this case, the communication part 410 communicates with an external device. For example, the external device is the display part 500 or a user terminal 10. Accordingly, the user terminal 10 or the display part 500 communicates with the light therapy device 1000 of the present invention.

In this case, the user terminal 10 is provided, for example, to the form of a device having an input part by which texts can be inputted and an output part can be displayed on a screen.

The user terminal 10 may be selected from all types of handheld wireless communication devices having touch screen panels, such as a smartphone, a personal digital assistant (PDA), a portable multimedia player (PMP), a tablet PC, and the like and otherwise from devices on which applications are installed and executed, such as a desktop PC, a tablet PC, a laptop PC, an IPTV having a setup box, and the like.

In this case, the communication part 410 communicates with the user terminal 10 using various wired and wireless communication technologies, such as an internet, an intranet, a mobile communication network, a satellite communication network, and the like.

In this case, the communication network generally includes a closed network such as a local area network (LAN), a wide area network (WAN), and the like, an open network such as an internet, a network such as code division multiple access (CDMA), wideband code division multiple access (WCDMA), a global system for mobile communication (GSM), long term evolution (LTE), evolved packet core (EPC), and the like, a next generation network, and a computing network.

The battery 420 serves to supply power to various parts disposed in the light therapy device 1000 of the present invention.

For example, the battery 420 is charged through a charging terminal (not shown) disposed on the light therapy device 1000 of the present invention, and otherwise, if the battery 420 is located around a charging supply device (not shown), it may be automatically charged wirelessly.

The battery 420 charged through the above process supplies the power to the generators 300 and other parts of the light therapy device 1000 of the present invention.

Further, the controller 430 is electrically connected to the communication part 410. Accordingly, the operating information transmitted from the user terminal 10 is transferred to the controller 430 through the communication part 410.

As a result, the operation of the controller 430 is controlled through user terminal 10 by the user. In specific, the operating time of the corresponding generator 300 and the wavelength ranges are selectively controlled through the user terminal 10 by the user.

In this case, in operating the generators 300 through the user terminal 10 by the user, the operations of the generators 300 are controlled to the unit of a predetermined time. For example, the operations of the generators 300 are controlled so that the generators 300 operate for five minutes, are stopped for 30 seconds, and operate again for five minutes. Like this, the operating time or states of the generators 300 are selectively controlled in accordance with the body conditions of the user.

Further, the temperature sensor 440 serves to measure the surface temperature of the corresponding generator 300 or the corresponding earhole insertion member 200. The surface temperature measured through the temperature sensor 440 is transmitted to the user terminal 10 through the communication part 410.

Accordingly, the operations of the generators 300 are controlled through the user terminal 10 so that the generators 300 have the temperatures as required by the user.

Further, if the measured temperature through the temperature sensor 440 is over a predetermined temperature, the controller 430 automatically stops the operation of the corresponding generator 300. If the temperature of the generator 300 is drastically raised during the infrared treatment, the skin of the user's earhole may be burnt, and under such control of the controller 430, accordingly, the skin of the user's earhole can be prevented from being burnt.

So as to prevent cross infection from occurring, further, the light therapy device 1000 of the present invention is provided with spare caps and ultraviolet sterilizing LEDs mounted on a cradle for charging the product, thereby preventing the cross infection from occurring when the light therapy device 1000 is not often disinfected or shared with other users.

Further, the controller 430 serves to control at least one of the plurality of LEDs 320 according to the measured temperature through the temperature sensor 440 so that the at least one LED 320 irradiates infrared light. For example, if the measured temperature through the temperature sensor 440 is over the predetermined temperature, the irradiation of the far-infrared light with a relatively high temperature is stopped, and only the near-infrared light is irradiated. Further, if power is initially supplied, the controller 430 controls the plurality of LEDs 320 so that only the far-infrared light with a relatively high temperature is irradiated. After that, if the measured temperature through the temperature sensor 440 reaches the predetermined temperature, the irradiation of the far-infrared light is stopped, and only the near-infrared light is irradiated. That is, the appropriate infrared light is irradiated according to the measured temperature through the temperature sensor 440, thereby preventing the damage and burning caused by heating from occurring, while the infrared treatment is being automatically performed.

Figure 8:
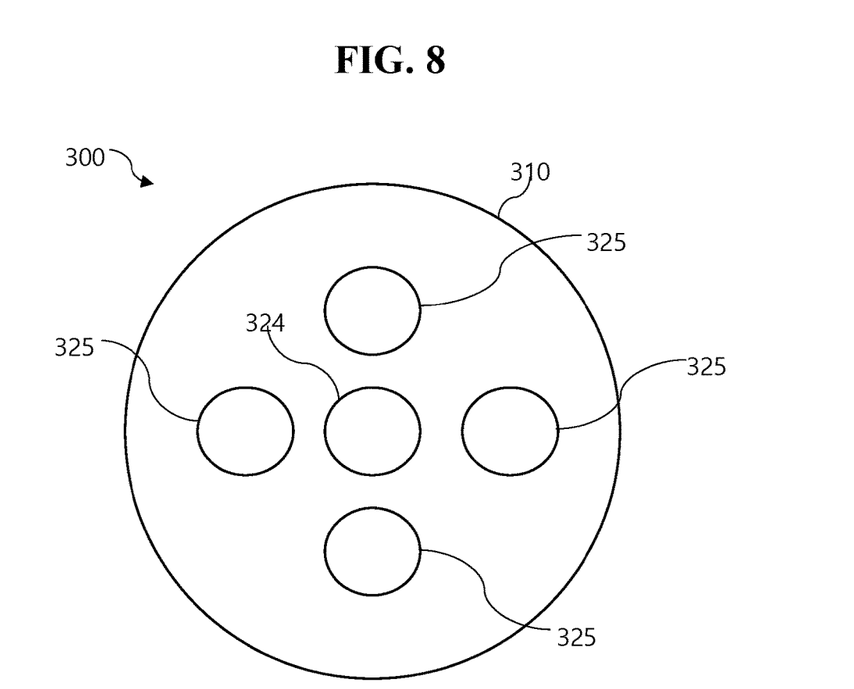
FIG. 8 is a block diagram showing another configuration of the generator of the light therapy device according to the present invention.
Figure 9:
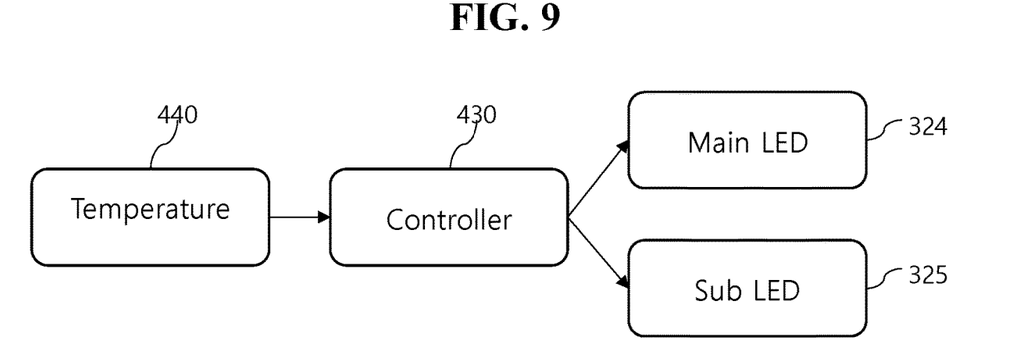
FIG. 9 is a block diagram showing a control configuration of the light therapy device according to the present invention.

Referring to FIGS. 8 and 9, further, the plurality of LEDs 320 include a main LED 324 for irradiating far-infrared light and sub LEDs 325 for irradiating near-infrared light. In specific, the main LED 324 is disposed at the center of the casing 310 and irradiates far-infrared light by the control of the controller 430. Further, the sub LEDs 325 are arranged radially around the main LED 324 and irradiate near-infrared light by the control of the controller 430. In this case, the sub LEDs 325 irradiate near-infrared light with different wavelengths. As a result, the far-infrared light is irradiated from the main LED 324, and the near-infrared light is irradiated from the sub LEDs 325, so that the infrared light is balancedly irradiated onto the user's ear. Otherwise, a plurality of main LEDs 324 may be provided, and in this case, a plurality of sub LEDs 325 are arranged around each main LED 324.

Figure 10:
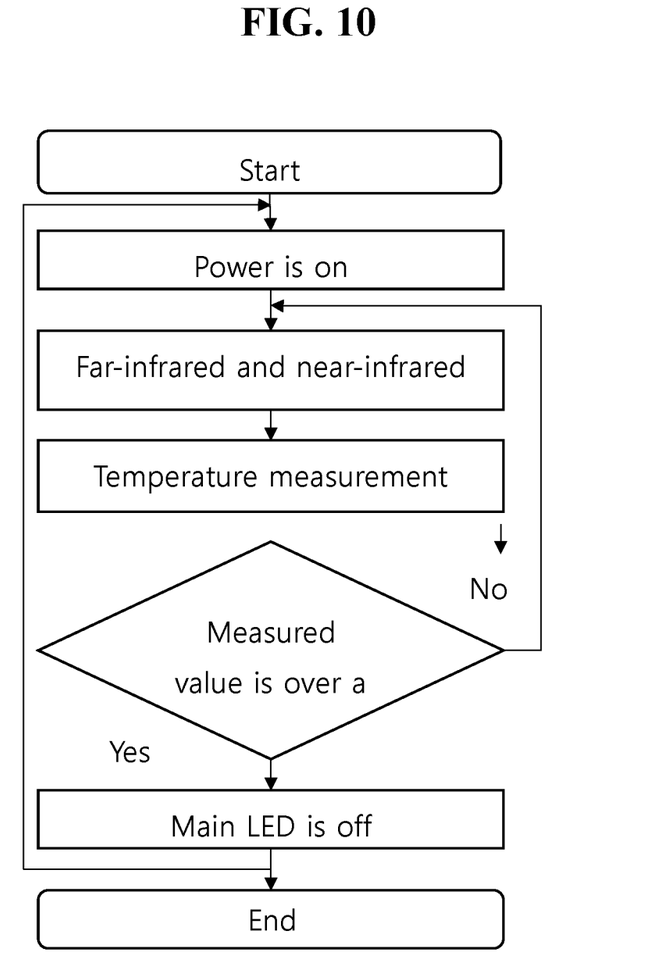
FIG. 10 is a flowchart showing a method for controlling the light therapy device according to the present invention.

Referring further to FIG. 10, if the power from the battery 420 is supplied to the generator 300, the controller 430 controls the main LED 324 and the sub LEDs 325 so that they irradiate the far-infrared and near-infrared light. In this case, if the measured temperature through the temperature sensor 440 is over the predetermined temperature, the irradiation of the far-infrared light from the main LED 324 is stopped.

In more specific, if the button 510 is pressed in the automatic mode to supply power to the generators 300, the main LED 324 and the sub LEDs 325 irradiate the far-infrared and near-infrared light, and the surface temperatures of the generators 300 are measured through the temperature sensors 440 and transmitted to the controllers 430. After that, it is determined through the controllers 430 whether the measured values of the temperature sensors 440 are over the predetermined temperatures. In this case, if it is determined that the measured values of the temperature sensors 440 are less than the predetermined temperatures, the controllers 430 control the main LED 324 and the sub LEDs 325 so that they consistently irradiate the far-infrared and near-infrared light. Contrarily, if it is determined that the measured values of the temperature sensors 440 are greater than the predetermined temperatures, the controllers 430 control the main LED 324 so that the irradiation of the far-infrared light from the main LED 324 is stopped. As a result, the damage and burning caused by heating can be prevented.

It is to be understood that the disclosed embodiments are merely exemplary of the invention, which can be embodied in various forms. Those skilled in the art will envision many other possible variations within the scope of the present invention.

The present invention may be modified in various ways and may have several exemplary embodiments. However, this does not limit the invention within specific embodiments and it should be understood that the invention covers all the modifications, equivalents, and replacements within the idea and technical scope of the invention.

EXPLANATIONS OF REFERENCE NUMERALS

10: User terminal
100: Body
110: Power supply part
120: Extension body
130: Wire
131: Port
200: Earhole insertion member
300: Generator
310: Casing
320: LED
312: First LED
322: Second LED
323: Third LED
324: Main LED
325: Sub LED
400: Management part
410: Communication part
420: Battery
430: Controller
440: Temperature sensor
500: Display part
510: Button
1000: Light therapy device

The invention claimed is:

1. A light therapy device comprising:
bodies configured to be supported against a user's auricles;
an earhole insertion member coupled to each body and configured to be inserted into the user's earhole, wherein the earhole insertion member is formed of a heat-resistant material in a tapered shape whose diameter gradually decreases toward the user's ear;
a generator provided at a base portion of the earhole insertion member and configured to irradiate infrared light, wherein each generator comprises: a casing; and a plurality of LEDs disposed on one side of the casing, the plurality of LEDs comprising a main LED configured to irradiate far-infrared light and a plurality of sub LEDs configured to irradiate near-infrared light, wherein the main LED is disposed at a central portion of the casing and the plurality of sub LEDs are radially arranged around the main LED;
a temperature sensor disposed on each body and configured to measure a temperature of the earhole insertion member or the generator; and
a controller disposed on the bodies and configured to control the generator, wherein the controller is configured to stop irradiation of the generator when a measurement value of the temperature sensor is greater than or equal to a preset value.

2. The light therapy device according to claim 1, wherein the plurality of LEDs are spaced apart from one another by a predetermined distance.

3. The light therapy device according to claim 1, wherein each body is roundedly formed.

4. The light therapy device according to claim 1, further comprising management parts disposed on the bodies,
wherein each management part comprises:
a communication part communicating with an external device; and
a battery for supplying power to corresponding generator.

5. The light therapy device according to claim 4, wherein the controller is configured to control the main LED or the plurality of sub LEDs according to the temperature measured by the temperature sensor to thus allow the main LED or the plurality of sub LEDs to irradiate the infrared light.

6. The light therapy device according to claim 4, further comprising a display part spaced apart from the bodies and configured to receive operating states of the controller, the temperature sensor, and the generator via the communication part and thus display the operating states received.

* * * * *